A. GOODFELLOW.
LAWN MOWER ATTACHMENT.
APPLICATION FILED OCT. 24, 1919.

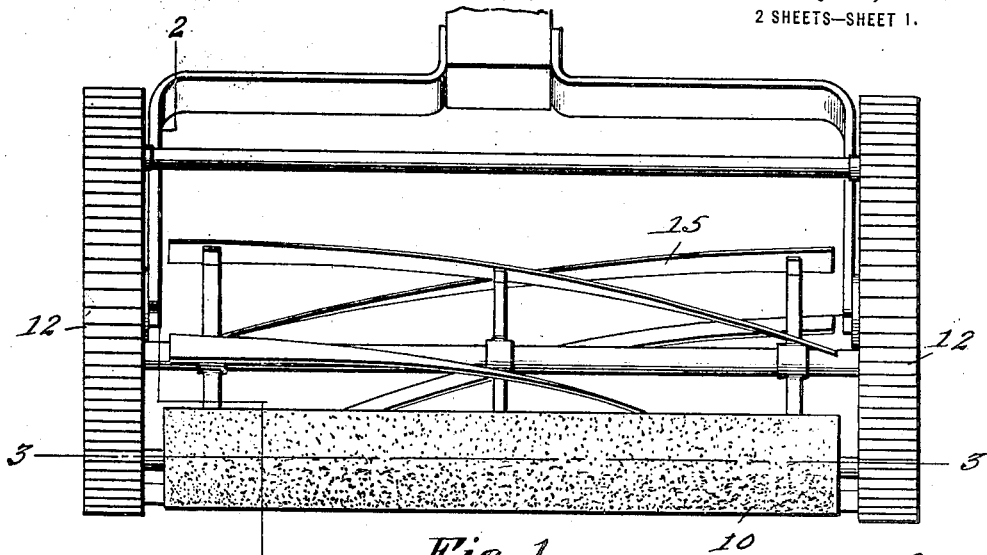
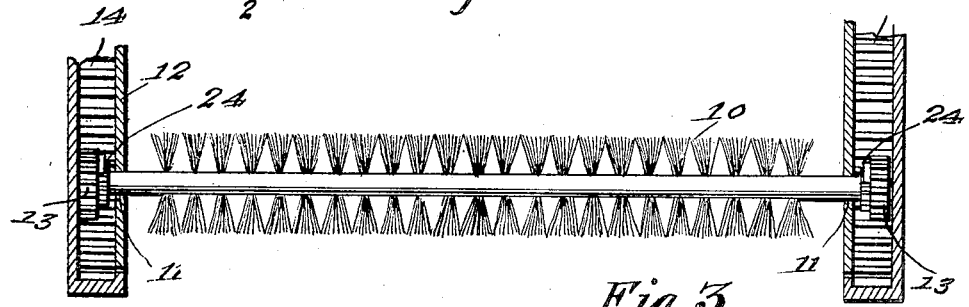
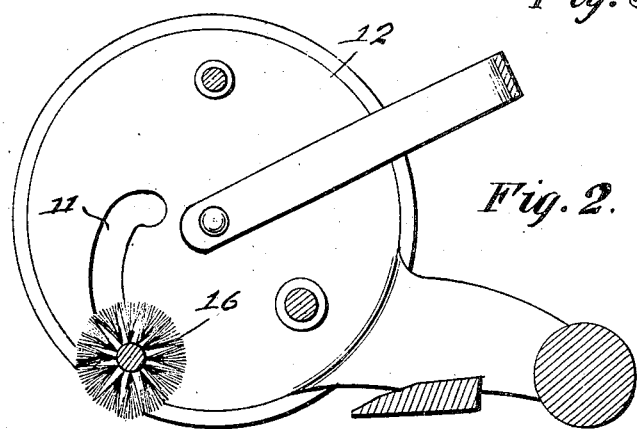

1,379,555.

Patented May 24, 1921.
2 SHEETS—SHEET 2.

WITNESS:
R. A. Thomas.

INVENTOR.
BY A. Goodfellow
Victor J. Evans
ATTORNEY.

UNITED STATES PATENT OFFICE.

ALLAN GOODFELLOW, OF NORTON, MASSACHUSETTS.

LAWN-MOWER ATTACHMENT.

1,379,555.  Specification of Letters Patent.  Patented May 24, 1921.

Application filed October 24, 1919. Serial No. 332,943.

*To all whom it may concern:*

Be it known that I, ALLAN GOODFELLOW, a citizen of the United States, residing at Norton, in the county of Bristol and State of Massachusetts, have invented new and useful Improvements in Lawn-Mower Attachments, of which the following is a specification.

This invention relates to improvements or attachments for lawn mowers, and has for an object the provision of means carried by the mower and located in advance of the cutting blades for causing the grass to assume an upright position before being reached by the said blades. This eliminates the unsightly appearance of uneven lines, due to the grass being wet and lying in a more or less flat position, so as to be out of the path of the cutting blades, the sun afterward drying the grass and causing it to assume an upright position, which results in patches or scattered blades of long grass.

The invention further aims to provide means whereby the invention may be moved to an inactive position when desired; for example, when the length of the grass is such as to render the use of the invention impracticable.

Other objects and advantages of the invention will appear as the following description is read in connection with the accompanying drawings.

In the drawings:

Figure 1 is a front elevation of a lawn mower, with the invention applied thereto.

Fig. 2 is a central transverse sectional view.

Fig. 3 is a section on the line 3—3 of Fig. 1.

Referring in detail to the drawings, like characters of reference denote corresponding parts throughout the several views.

Figure 4:
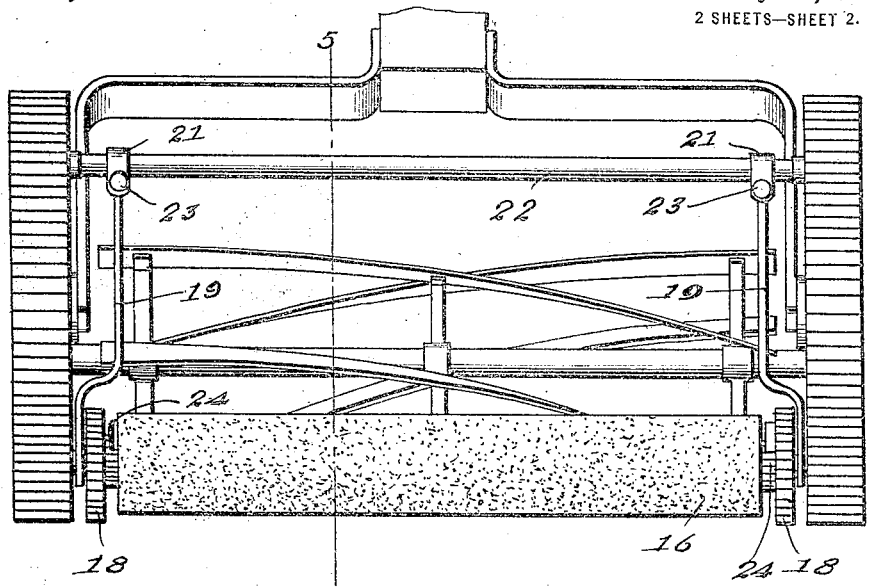
Fig. 4 is a front elevation of a modified form of the invention secured to a lawn mower.

The invention is designed either for use as a part of a lawn mower, or as an attachment to be applied thereto. In Figs. 1 to 3 of the drawings the first mentioned form of the invention is illustrated. This comprises a brush 10 of circular cross sectional form having a shaft extending therethrough. The opposite ends of this shaft pass through openings 11 formed in each of the opposed side plates of the traction wheels 12 of the mower. The openings or slots 11 are of arcuate formation and the ends of the shaft of the brush extend therethrough and have secured thereon pinions 13 which mesh with an internal gear 14 in each of the traction wheels 12. The slots 11 are so formed and arranged that the brush may be moved inward and upward toward the center of the traction wheels, so as to be out of contact with the grass, in the event the use of the brush is not desired. As illustrated in the drawings, the brush 10 is positioned in advance of the cutting blades 15 of the mower, the purpose being to revolve the brush in a direction opposite to the direction of movement of the mower. This will sweep the grass forward and upward, causing the blades of grass to assume an upright position before being reached by the cutting blades 15 of the mower. These cutting blades will then contact with all of the blades of grass over which the mower passes and result in an even and neatly mowed lawn.

Figure 5:
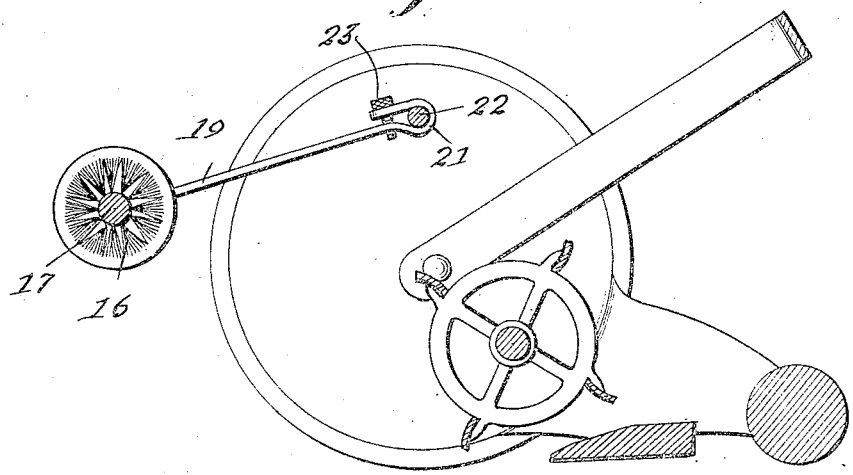
Fig. 5 is a central transverse sectional view of Fig. 4 with the attachment in an elevated or inactive position.

In Figs. 4 and 5 of the drawings, the invention is shown in the form of an attachment, which may be secured to or removed from the lawn mower, as desired. In this form of the invention, there is provided a brush 16, also of circular formation and having extending from each end the opposite ends of a shaft 17. Wheels and rollers 18 are mounted upon the opposite ends of the shaft 17, which ends are also mounted to revolve in bearings carried by one end of arms 19. The opposite ends of the arms 19 are provided with hook-like extremities 21, which are adapted to engage over a stationary cross bar 22 of the lawn mower and to be removably held in such engagement through the medium of a set screw 23, or other fastening device. In this form of the invention, the brush may be either swung upward with the bar 22 as a pivot, or may be removed from the said bar by removing the fastening devices 23. By securing the wheels upon the end of the brush shaft by a pawl and ratchet connection 24, the brush will rotate when the mower is moved forward and will remain stationary when the mower is moved rearwardly.

The invention is susceptible of various changes in its form, proportions and minor details of construction and the right is herein reserved to make such changes as properly fall within the scope of the appended claims.

Having described the invention, what is claimed is:

1. The combination with a lawn mower, of a brush carried by the mower and operating in advance of the cutting blades thereof for causing the grass to assume an upright position before being reached by said blades and means for revolving the brush when the mower is traveling in one direction and permitting the brush to remain idle when the mower is traveling in an opposite direction.

2. The combination with a lawn mower, of a brush carried by the mower and operating in advance of the cutting blades thereof for causing the grass to assume an upright position before being reached by said blades and means including a pawl and ratchet mechanism for revolving the brush when the mower is traveling in one direction and permitting the brush to remain idle when the mower is traveling in an opposite direction.

In testimony whereof I affix my signature.

ALLAN GOODFELLOW.